(12) United States Patent
Haraguchi

(10) Patent No.: US 10,028,495 B2
(45) Date of Patent: Jul. 24, 2018

(54) DUAL-BEARING REEL

(71) Applicant: Shimano Inc., Sakai, Osaka (JP)

(72) Inventor: Hitoshi Haraguchi, Osaka (JP)

(73) Assignee: SHIMANO INC., Sakai, Osaka (JP)

( * ) Notice: Subject to any disclaimer, the term of this patent is extended or adjusted under 35 U.S.C. 154(b) by 338 days.

(21) Appl. No.: 15/014,788

(22) Filed: Feb. 3, 2016

(65) Prior Publication Data

US 2016/0249595 A1 Sep. 1, 2016

(30) Foreign Application Priority Data

Feb. 26, 2015 (JP) .................................. 2015-037117

(51) Int. Cl.
*A01K 89/01* (2006.01)
*A01K 89/015* (2006.01)
*A01K 89/033* (2006.01)

(52) U.S. Cl.
CPC ...... *A01K 89/0193* (2015.05); *A01K 89/0183* (2015.05); *A01K 89/033* (2013.01)

(58) Field of Classification Search
CPC .............. A01K 89/015; A01K 89/0186; A01K 89/0189; A01K 89/0191; A01K 89/0192; A01K 89/0193
See application file for complete search history.

(56) References Cited

U.S. PATENT DOCUMENTS

| 4,341,366 | A | * | 7/1982 | Kawada | ............... | A01K 89/015 |
| | | | | | | 192/70.22 |
| 4,648,566 | A | * | 3/1987 | Furomoto | ............ | A01K 89/015 |
| | | | | | | 192/48.5 |
| 4,738,409 | A | * | 4/1988 | Sato | ..................... | A01K 89/015 |
| | | | | | | 242/241 |
| 5,123,609 | A | * | 6/1992 | Noda | ................... | A01K 89/015 |
| | | | | | | 242/261 |
| 5,746,381 | A | * | 5/1998 | Miyazaki | ............. | A01K 89/015 |
| | | | | | | 192/69.63 |
| 5,850,979 | A | * | 12/1998 | Murayama | ........... | A01K 89/015 |
| | | | | | | 242/261 |
| 5,875,986 | A | * | 3/1999 | Miyazaki | ............. | A01K 89/015 |
| | | | | | | 242/261 |
| 6,047,913 | A | * | 4/2000 | Yamaguchi | .......... | A01K 89/015 |
| | | | | | | 242/310 |

(Continued)

FOREIGN PATENT DOCUMENTS

JP 2014100078 A 6/2014

*Primary Examiner* — Emmanuel Monsayac Marcelo

(74) *Attorney, Agent, or Firm* — United IP Counselors, LLC

(57) ABSTRACT

A dual-bearing reel includes a reel unit, a spool and an intervening member. The reel unit includes a first reel body and a second reel body. The first reel body includes a first through hole extending in a rotational axis direction. The spool is rotatably disposed between the first reel body and the second reel body. The spool includes a bobbin trunk and a flange. The flange is formed on a first reel body-side end of the bobbin trunk. The intervening member is disposed between the first reel body and the spool. The intervening member is attached to the first reel body. The intervening member includes an annular wall and a second through hole. The annular wall includes an inner peripheral surface opposed to an outer peripheral surface of the flange. The second through hole extends in the rotational axis direction.

11 Claims, 6 Drawing Sheets

(56) References Cited

U.S. PATENT DOCUMENTS

| | | | | |
|---|---|---|---|---|
| 2001/0038052 A1* | 11/2001 | Oishi | ................... | A01K 89/015 |
| | | | | 242/255 |
| 2007/0181728 A1* | 8/2007 | Kawasaki | .............. | A01K 89/00 |
| | | | | 242/310 |
| 2011/0011968 A1* | 1/2011 | Ikuta | ................... | A01K 89/015 |
| | | | | 242/307 |
| 2011/0309177 A1* | 12/2011 | Hirayama | ............ | A01K 89/015 |
| | | | | 242/255 |
| 2016/0106083 A1* | 4/2016 | Niitsuma | ........... | A01K 89/0192 |
| | | | | 242/310 |

* cited by examiner

DUAL-BEARING REEL

CROSS-REFERENCE TO RELATED APPLICATIONS

This application claims priority to Japanese Patent Application No. 2015-037117 filed on Feb. 26, 2015, the entirety of which is hereby incorporated by reference in its entirety.

BACKGROUND

Technical Field

The present disclosure relates to a dual-bearing reel.

Background Information

A dual-bearing reel includes a frame and a spool. The frame includes a first side plate and a second side plate. The spool is disposed between the first side plate and the second side plate. The first side plate includes an annular wall opposed to the outer peripheral surface of a flange of the spool so as to prevent a fishing line from getting stuck in a gap between the first side plate and the flange (e.g., Japan Laid-open Patent Application Publication No. 2014-100078). The fishing line is prevented from getting stuck in the gap between the first side plate and the flange by adjusting the interval between the inner peripheral surface of the annular wall and the outer peripheral surface of the flange.

There is a risk that the fishing line gets stuck in the gap between the first side plate and the flange unless the interval between the inner peripheral surface of the annular wall and the outer peripheral surface of the flange is narrow. Additionally, smooth rotation of the spool is hindered even when the inner peripheral surface of the annular wall and the outer peripheral surface of the flange are partially contacted. Therefore, the annular wall is required to be disposed accurately concentric to a spool shaft. However, the annular wall is machined on the first side plate by cutting, and the first side plate is designed to be opposed to the second side plate. Hence, a limitation is imposed on enhancement of accuracy in disposing the annular wall concentrically to the spool shaft.

SUMMARY

It is an object to provide a dual-bearing reel in which an annular wall can be disposed concentrically to a spool shaft with enhanced accuracy.

A dual-bearing reel according to an aspect of the present disclosure includes a reel unit, a spool and an intervening member. The reel unit includes a first reel body and a second reel body. The first reel body includes a first through hole extending in a rotational axis direction. The spool is rotatably disposed between the first reel body and the second reel body. The spool includes a bobbin trunk and a flange. The flange is formed on a first reel body-side end of the bobbin trunk. The intervening member is disposed between the first reel body and the spool. The intervening member is attached to the first reel body. The intervening member includes an annular wall and a second through hole. The annular wall includes an inner peripheral surface opposed to an outer peripheral surface of the flange. The second through hole extends in the rotational axis direction.

According to this construction, the annular wall is formed not on the reel unit but on the intervening member that is a member provided separately from the reel unit. Therefore, the annular wall can be easily formed, and furthermore, can be disposed concentrically to the spool shaft with enhanced accuracy.

Preferably, the dual-bearing reel further includes a first bearing member. The first bearing member is disposed within the second through hole, and supports the spool such that the spool is rotatable.

Preferably, the dual-bearing reel further includes a pinion gear and a second bearing member. The pinion gear is disposed within the first reel body and extends in the rotational axis direction. The second bearing member is disposed within the first through hole and supports the pinion gear such that the pinion gear is rotatable.

Preferably, the second through hole includes a first inner diameter part having a smaller inner diameter than the first through hole. A first end surface of the second bearing member is opposed to the intervening member. According to this construction, a step is formed by a difference in an inner diameter between the first inner diameter part and the first through hole. The step restricts axial movement of the second bearing member.

Preferably, the second through hole includes a second inner diameter part having a larger inner diameter than the first inner diameter part. The first bearing member is disposed in the second inner diameter part. According to this construction, a step formed between the first inner diameter part and the second inner diameter part can restrict axial movement of the first bearing member.

Preferably, the intervening member is made of a synthetic resin. According to this construction, it is not required to perform a complex post-treatment and surface finishing for corrosion inhibition or corrosion resistance.

Preferably, the dual-bearing reel further includes a handle, a clutch mechanism and a clutch operating member. The handle is rotatably mounted to the reel unit. The handle is a member for rotating the spool. The clutch mechanism is configured to be switched between a transmission allowed state for allowing transmission of a rotation between the handle and the spool and a transmission blocked state for blocking the transmission of the rotation. The clutch operating member is configured to be operated by a user to switch the clutch mechanism from one to the other of the transmission allowed state and the transmission blocked state. The clutch operating member extends along an outer peripheral surface of the annular wall of the intervening member.

Preferably, the dual-bearing reel further includes a spool shaft configured to be unitarily rotated with the spool. The pinion gear is configured to be moved in one axial direction approaching the second reel body so as to be engaged with the spool shaft. Additionally, the pinion gear is configured to be moved in the other axial direction separating from the second reel body so as to be disengaged from the spool shaft.

Preferably, the spool shaft includes an engaging pin protruding in a radial direction. The pinion gear includes an engaging recess configured to be engageable with the engaging pin.

Overall, according to the present disclosure, the annular wall can be disposed concentrically to the spool shaft with enhanced accuracy.

BRIEF DESCRIPTION OF THE DRAWINGS

Referring now to the attached drawings which form a part of this original disclosure.

DETAILED DESCRIPTION OF EMBODIMENTS

Figure 1:
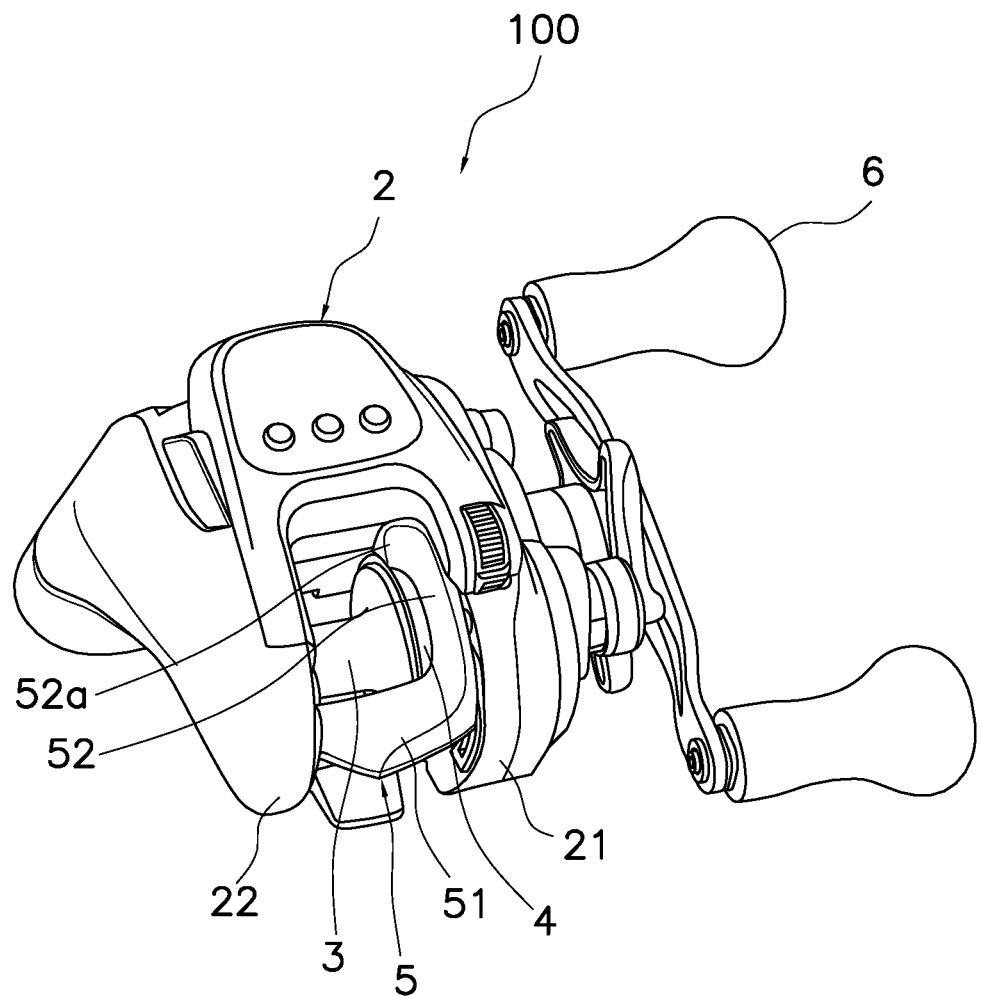
FIG. 1 is a perspective view of a dual-bearing reel.
Figure 2:
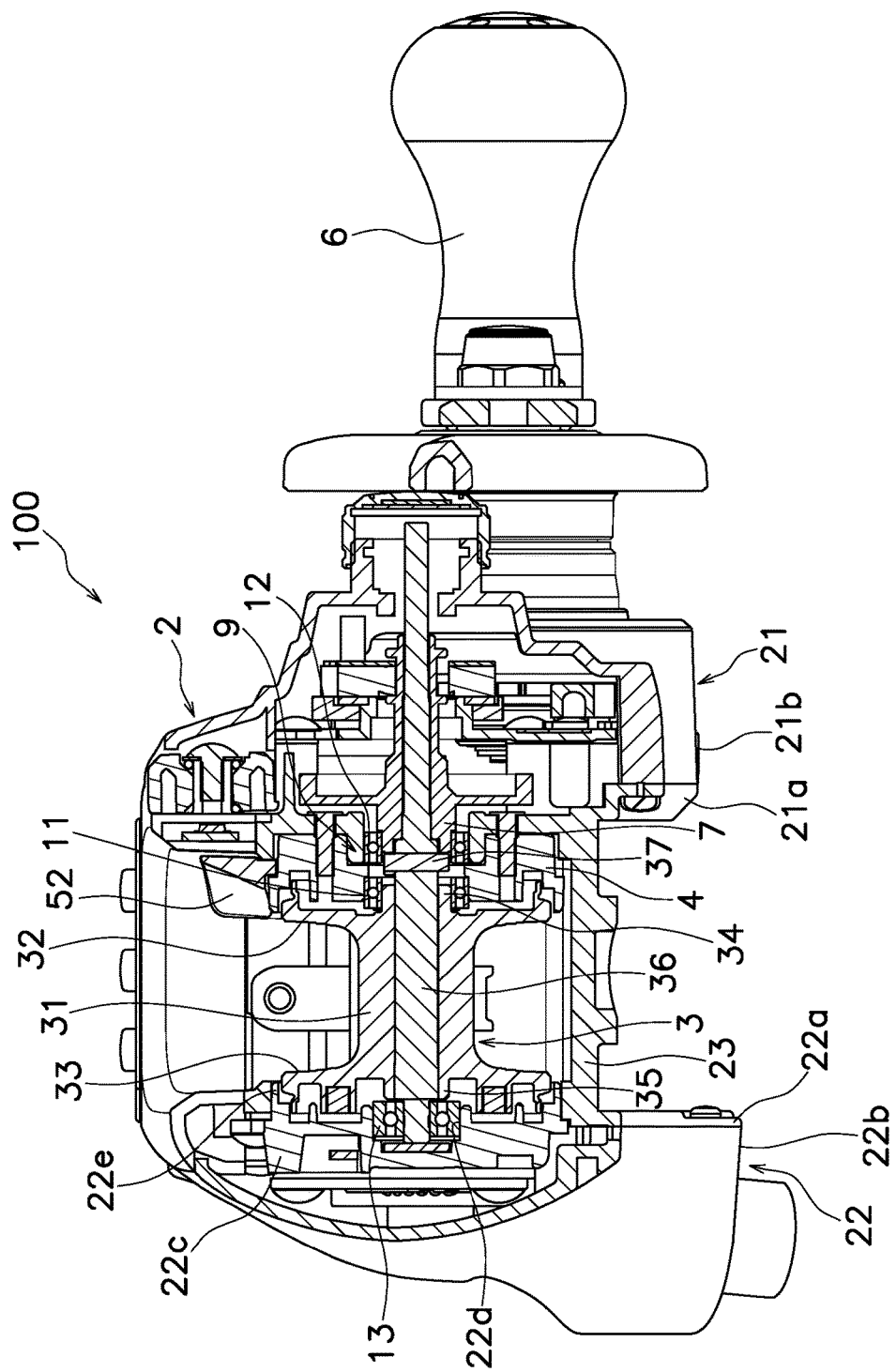
FIG. 2 is a cross-sectional view of the dual-bearing reel.

A dual-bearing reel according to a preferred embodiment will be hereinafter explained with reference to the attached drawings. FIG. 1 is a perspective view of the dual-bearing reel, whereas FIG. 2 is a cross-sectional view of the dual-bearing reel. It should be noted that in the following explanation, the term "rotational axis direction" means the extending direction of the rotational axis of a spool, i.e., the extending direction of a spool shaft. Additionally, the term "radial direction" indicates a radial direction of a circle about the rotational axis of the spool. The term "circumferential direction" indicates a circumferential direction of the circle about the rotational axis of the spool. Moreover, the term "radial view" means a condition seen along the radial direction.

As shown in FIG. 1, a dual-bearing reel 100 is configured to forwardly reel out a fishing line. The dual-bearing reel 100 includes a reel unit 2, a spool 3, an intervening member 4, a clutch operating member 5 and a handle 6. Additionally, as shown in FIG. 2, the dual-bearing reel 100 further includes a pinion gear 7, a spool shaft 36, a clutch mechanism 9 and first to third bearing members 11 to 13. It should be noted that the dual-bearing reel 100 according to the present preferred embodiment is constructed as an electric reel.

The reel unit 2 includes a first reel body 21 and a second reel body 22. The first reel body 21 and the second reel body 22 are disposed at an interval in the rotational axis direction. When described in detail, the first reel body 21 is disposed on a first end side of the spool 3, whereas the second reel body 22 is disposed on a second end side of the spool 3. The first reel body 21 and the second reel body 22 are coupled to each other through a coupling part 23. The handle 6 is rotatably mounted to the reel unit 2. When described in detail, the handle 6 is rotatably mounted to the first reel body 21. The spool 3 is configured to be rotated in conjunction with rotation of the handle 6.

The first reel body 21 includes a first side plate 21a and a first cover 21b. The first reel body 21 includes an accommodation space in the interior thereof. The accommodation space is defined by the first side plate 21a and the first cover 21b.

Figure 3:
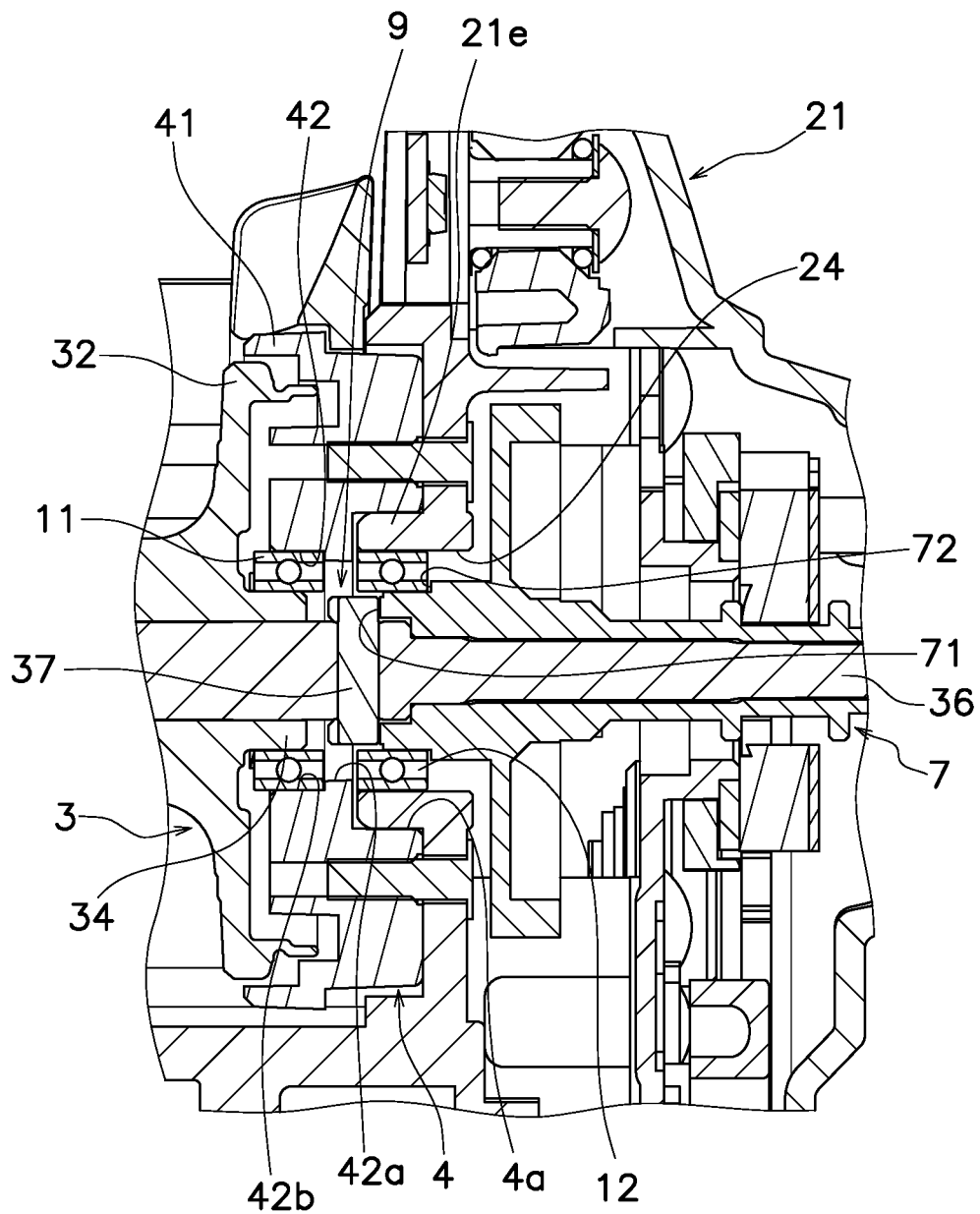
FIG. 3 is an enlarged cross-sectional view of the dual-bearing reel.

As shown in FIG. 3, the first reel body 21 includes a protruding part 21e and a first through hole 24. The protruding part 21e cylindrically protrudes toward the second reel body 22. The first through hole 24 penetrates the center of the protruding part 21e. The first through hole 24 extends in the rotational axis direction and opens toward the second reel body 22. The interior and the exterior of the first reel body 21 are communicated through the first through hole 24. The second bearing member 12 is disposed within the first through hole 24. The second bearing member 12 supports the pinion gear 7 such that the pinion gear 7 is rotatable. It should be noted that a groove and so forth are not necessarily formed on the inner peripheral surface of the first through hole 24.

Figure 4:
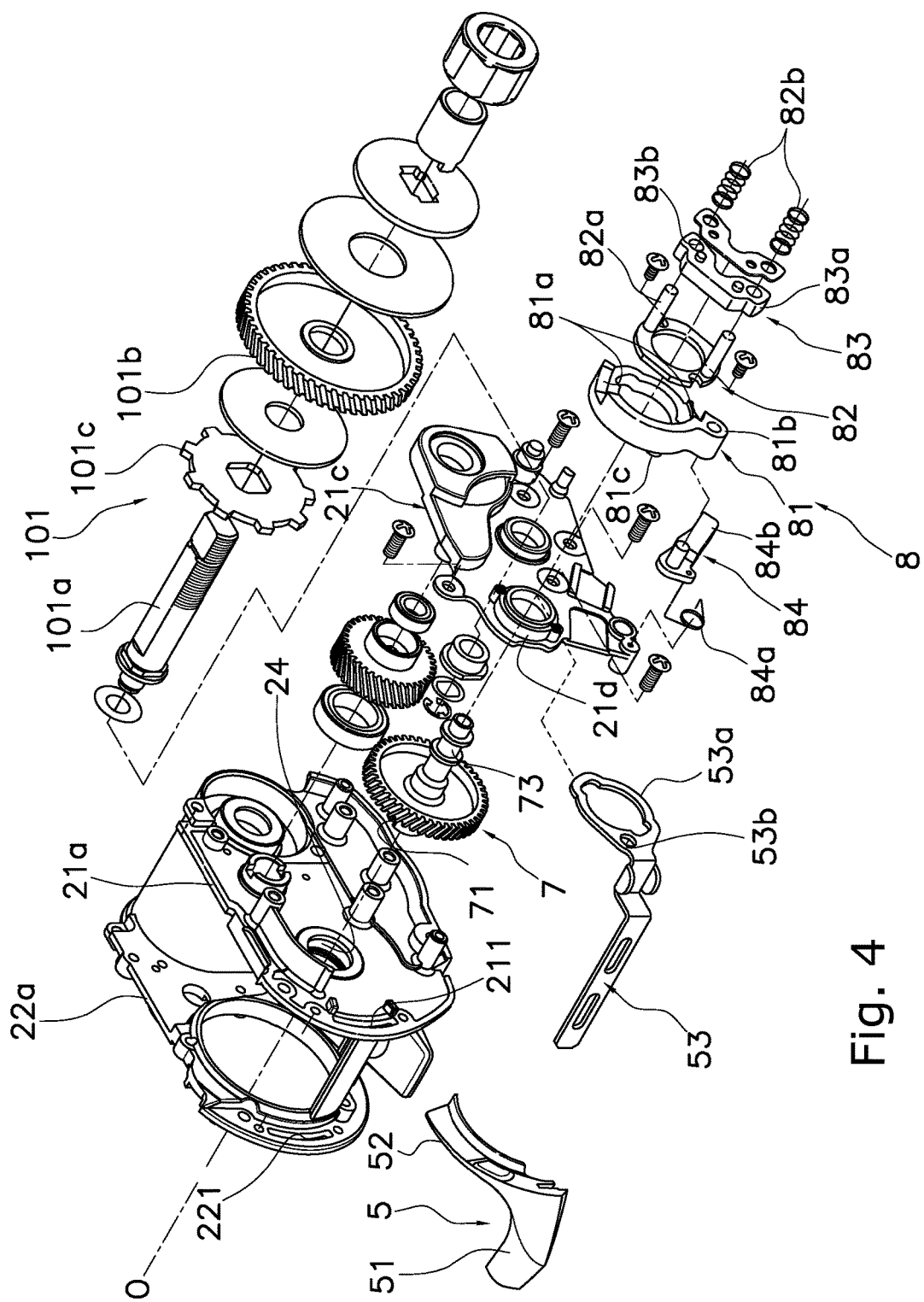
FIG. 4 is an exploded view of the dual-bearing reel.

As shown in FIG. 4, a rotation transmission mechanism 101 is accommodated in the accommodation space. The rotation transmission mechanism 101 is a mechanism configured to transmit rotation of the handle 6 to the spool 3 and so forth. The rotation transmission mechanism 101 includes a drive shaft 101a, a drive gear 101b and so forth. The drive shaft 101a is configured to be unitarily rotated with the handle 6. The drive gear 101b is configured to be unitarily rotated with the drive shaft 101a. The drive gear 101b is meshed with the pinion gear 7.

As shown in FIG. 2, the second reel body 22 includes a second side plate 22a and a second cover 22b. The second side plate 22a is connected to the first side plate 21a through the coupling part 23. The first side plate 21a, the second side plate 22a and the coupling part 23 are integrally formed and compose the frame of the reel unit 2. For example, the first side plate 21a, the second side plate 22a and the coupling part 23 are integrally formed by die-cast molding of an aluminum alloy.

The second reel body 22 includes a support portion 22c. The support portion 22c is attached to at least either the second side plate 22a or the second cover 22b. The support portion 22c includes a recess 22d for holding the third bearing member 13. The recess 22d extends in the rotational axis direction and opens toward the first reel body 21.

The support portion 22c includes a first annular wall 22e. The inner peripheral surface of the first annular wall 22e is opposed to the outer peripheral surface of a second flange 33 of the spool 3 to be described. The first annular wall 22e is formed on the outer peripheral end of the support portion 22c and protrudes toward the first reel body 21.

The spool 3 is rotatably disposed between the first reel body 21 and the second reel body 22. The spool 3 is attached to the spool shaft 36 and is configured to be unitarily rotated with the spool shaft 36. For example, the spool 3 and the spool shaft 36 are attached to each other by spline coupling or so forth so as not to be rotatable relatively to each other.

The spool 3 includes a bobbin trunk 31, a first flange 32 and the second flange 33. It should be noted that the first flange 32 corresponds to a flange of the present embodiment. The bobbin trunk 31 has a cylindrical shape and extends in the rotational axis direction. The fishing line is wound onto the outer peripheral surface of the bobbin trunk 31.

The first flange 32 and the second flange 33 extend radially outward from the both ends of the bobbin trunk 31. When described in detail, the first flange 32 is formed on the first reel body 21-side end of the bobbin trunk 31. On the other hand, the second flange 33 is formed on the second reel body 22-side end of the bobbin trunk 31. As described above, the outer peripheral surface of the second flange 33 is opposed to the inner peripheral surface of the first annular wall 22e.

The spool 3 further includes a first boss 34 and a second boss 35. The first and second bosses 34 and 35 extend in the rotational axis direction. When described in detail, the first boss 34 extends from the bobbin trunk 31 toward the first reel body 21. On the other hand, the second boss 35 extends from the bobbin trunk 31 toward the second reel body 22.

The spool shaft 36 is rotatably supported by the second reel body 22 and the intervening member 4 attached to the first reel body 21. When described in detail, the spool shaft 36 is supported by the second reel body 22 through the third bearing member 13. The spool shaft 36 is configured to be unitarily rotated with the spool 3. The spool shaft 36 includes an engaging pin 37 radially protruding therefrom.

The pinion gear 7 is disposed within the first reel body 21. The pinion gear 7 extends in the rotational axis direction. The pinion gear 7 is supported by the first reel body 21 through the second bearing member 12. Additionally, the pinion gear 7 is movable in the rotational axis direction.

As shown in FIG. 3, the pinion gear 7 includes an engaging recess 71 configured to be engaged with the engaging pin 37. The engaging recess 71 is formed on the second reel body 22-side end of the pinion gear 7. The pinion gear 7 includes a step 72 opposed to a second end surface of the second bearing member 12. The step 72 restricts the second bearing member 12 from moving in a direction separating from the second reel body 22. It should be noted that the second end surface of the second bearing member 12 is oriented oppositely to the second reel body 22. In other words, the second end surface of the second bearing member 12 is oriented to the handle 6.

Figure 5:
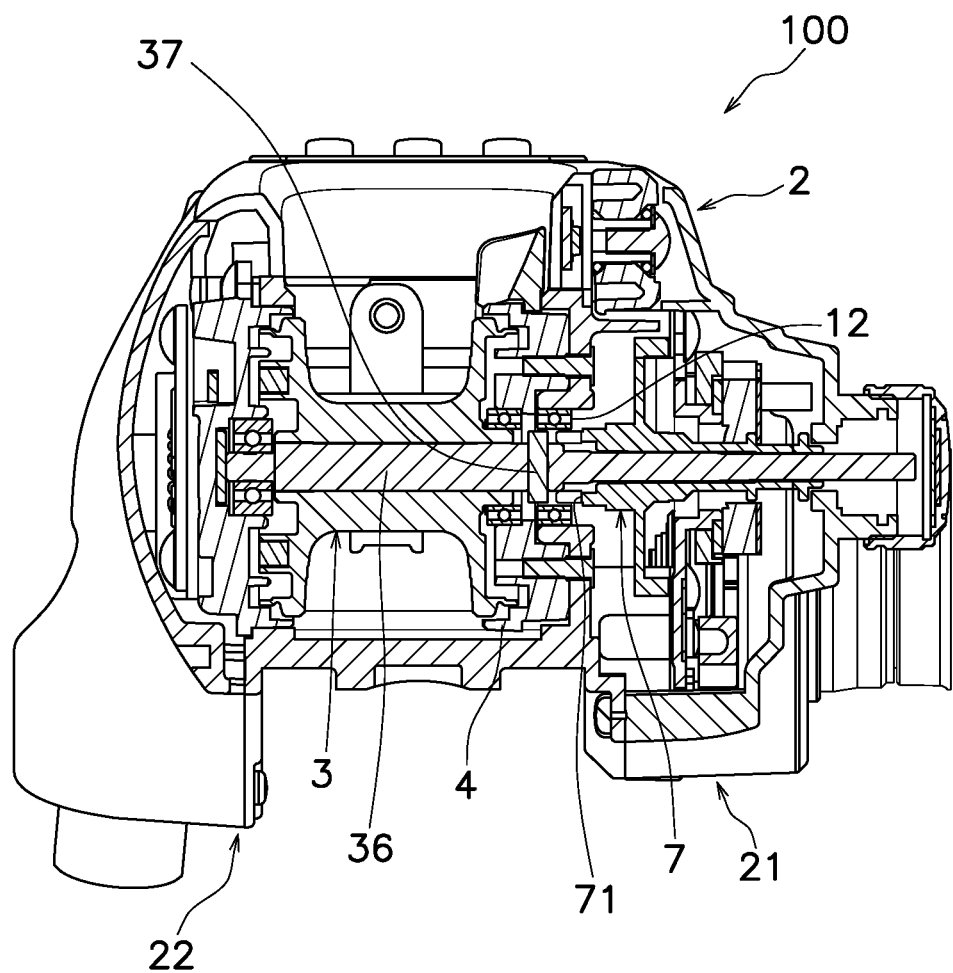
FIG. 5 is a cross-sectional view of the dual-bearing reel.

The clutch mechanism 9 is configured to be switched between a transmission allowed state and a transmission blocked state. When the clutch mechanism 9 is in the transmission allowed state, transmission of a rotation is allowed between the handle 6 and the spool 3. When the clutch mechanism 9 is in the transmission blocked state, the aforementioned transmission of the rotation is blocked. Specifically, the clutch mechanism 9 is constructed by the engaging pin 37 and the engaging recess 71. As shown in FIG. 5, when the pinion gear 7 is moved in the direction separating from the second reel body 22, the engaging pin 37 and the engaging recess 71 are disengaged from each other. As a result, the pinion gear 7 becomes rotatable relatively to the spool shaft 36. In other words, the clutch mechanism 9 is switched into the transmission blocked state. Contrarily, when the pinion gear 7 is moved in a direction approaching the second reel body 22, the engaging pin 37 and the engaging recess 71 are engaged as shown in FIG. 3. As a result, the pinion gear 7 becomes rotatable unitarily with the spool shaft 36. In other words, the clutch mechanism 9 is switched into the transmission allowed state.

Figure 6:
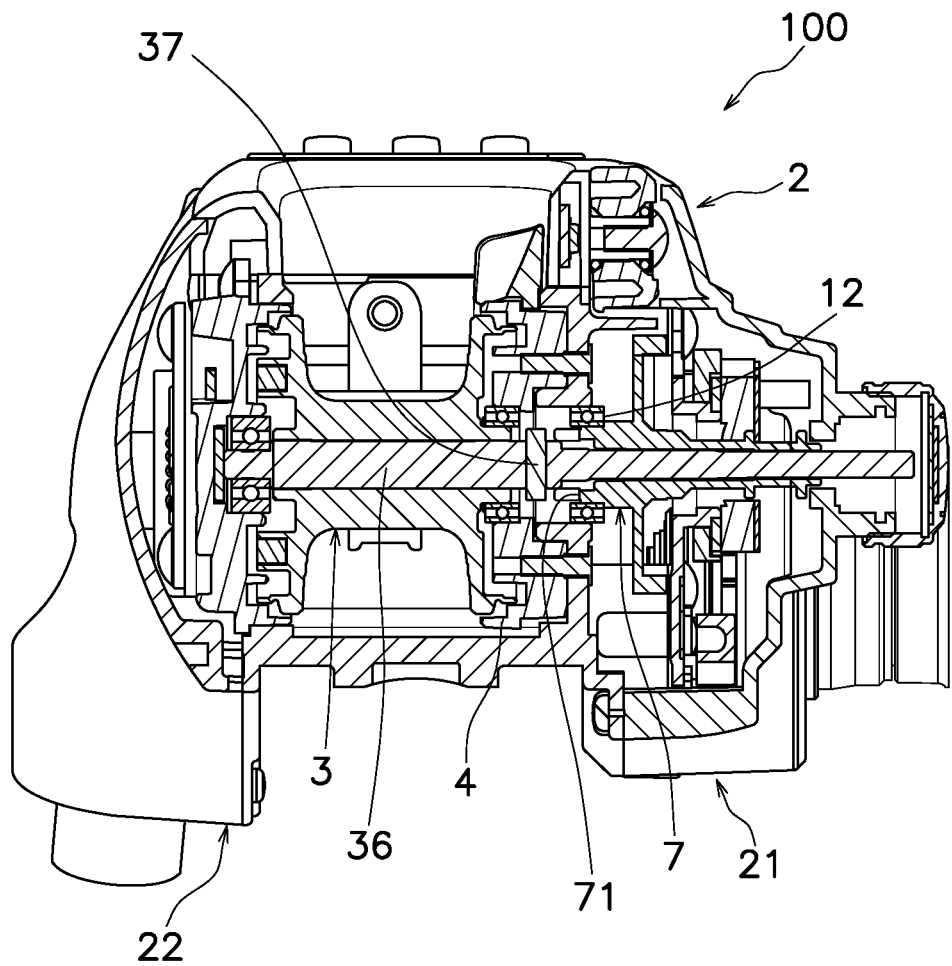
FIG. 6 is a cross-sectional view of the dual-bearing reel.

The step 72 of the pinion gear 7 herein restricts the second bearing member 12 from moving in the direction separating from the second reel body 22. Hence, the following advantageous effects are achieved in the present preferred embodiment. In short, even when the second bearing member 12 is adhered to the pinion gear 7, the pinion gear 7 is allowed to be moved together with the second bearing member 12 in the direction separating from the second reel body 22 as shown in FIG. 6.

As shown in FIG. 3, the intervening member 4 is disposed between the first reel body 21 and the spool 3. The intervening member 4 is made of, for instance, a synthetic resin. The intervening member 4 is a member provided separately from the reel unit 2, and is attached to the first reel body 21. The intervening member 4 is a first restriction means to be described. The intervening member 4 includes a second annular wall 41 and a second through hole 42. Specifically, the intervening member 4 has a disc shape, and the second annular wall 41 is formed on the outer peripheral end of the intervening member 4. Additionally, the second through hole 42 penetrates the center of the intervening member 4. The second through hole 42 continues to a recess 4a formed on the first reel body 21 side thereof. It should be noted that the second annular wall 41 corresponds to an annular wall of the present embodiment.

The second annular wall 41 protrudes toward the second reel body 22. The second annular wall 41 is constructed to surround the first flange 32. In other words, the inner peripheral surface of the second annular wall 41 is opposed to the outer peripheral surface of the first flange 32. The inner peripheral surface of the second annular wall 41 and the outer peripheral surface of the first flange 32 are disposed at an interval, but alternatively, may be contacted to each other. Additionally, in a radial view, the second annular wall 41 and the first flange 32 may be completely overlapped with each other, or alternatively, may be only partially overlapped with each other.

The second through hole 42 extends in the rotational axis direction. The first bearing member 11 is disposed within the second through hole 42. The first bearing member 11 supports the spool 3 such that the spool 3 is rotatable. When described in detail, the first bearing member 11 supports the first boss 34 such that the first boss 34 is rotatable.

The second through hole 42 includes a first inner diameter part 42a and a second inner diameter part 42b. The inner diameter of the first inner diameter part 42a is smaller than that of the first through hole 24. In other words, the inner diameter of the first inner diameter part 42a is smaller than the outer diameter of the second bearing member 12. A step is formed by a difference in an inner diameter between the first inner diameter part 42a and the first through hole 24. The step restricts an axial movement of the second bearing member 12. Thus, this step is a second restriction means for restricting the axial movement of the second bearing member 12. With the construction, a first end surface of the second bearing member 12 is opposed to the intervening member 4. In other words, the intervening member 4 restricts the second bearing member 12 from moving toward the second reel body 22. The intervening member 4 is therefore a first restriction means for restricting a movement of the second bearing member 12. The first end surface of the second bearing member 12 is oriented to the second reel body 22. It should be noted that in a well-known dual-bearing reel, an annular groove is located on the inner surface of the first through hole 24, and a snap ring is disposed in the annular groove so as to restrict the second bearing member 12 from moving toward the second reel body 22. However, in the present preferred embodiment, it is not required to form the annular groove on the inner surface of the first through hole 24 and dispose the snap ring in the annular groove. Therefore, machining can be easily done in forming the first through hole 24.

The inner diameter of the second inner diameter part 42b is larger than that of the first inner diameter part 42a. The first bearing member 11 is disposed in the second inner diameter part 42b. A step is defined by the first inner diameter part 42a and the second inner diameter part 42b, and restricts the first bearing member 11 from moving toward the first reel body 21. The step formed between the first inner diameter part 42a and the second inner diameter part 42b can restrict an axial movement of the first bearing member 11. This step is thus a third restriction means for restricting the axial movement of the first bearing member 11.

The protruding part 21e of the first reel body 21 is fitted to the recess 4a of the intervening member 4, whereby accuracy in concentrically disposing the first through hole 24 and the second through hole 42 (i.e., the first and second bearing members 11 and 12 and the second annular wall 41) can be reliably achieved.

As shown in FIG. 1, the clutch operating member 5 is a member to be operated by a user for switching the state of the clutch mechanism 9. When the clutch operating member 5 is operated by the user, the clutch mechanism 9 is switched between the transmission allowed state and the transmission blocked state. The clutch operating member 5 is pivotable about the rotational axis. The clutch operating member 5 includes a clutch-off operating part 51 and a clutch-on operating part 52.

The clutch-off operating part 51 is disposed rearward of the spool 3. Additionally, the clutch-off operating part 51 extends between the first reel body 21 and the second reel body 22. When the clutch-off operating part 51 is pressed down by an operation of the user, the clutch mechanism 9 is switched into the transmission blocked state.

The clutch-on operating part 52 is a part to be operated by the user in switching the clutch mechanism 9 into the transmission allowed state. Specifically, when the clutch-on operating part 52 is forwardly pressed by the user, the clutch mechanism 9 is switched into the transmission allowed state. In other words, when the clutch-on operating part 52 is moved forward, the clutch mechanism 9 is switched into the transmission allowed state.

The clutch-on operating part 52 extends along the outer peripheral surface of the second annular wall 41 of the intervening member 4. The clutch-on operating part 52 protrudes toward the second reel body 22. When described in detail, a tip 52a of the clutch-on operating part 52 protrudes toward the second reel body 22. In other words, the tip 52a protrudes in the axial direction. When the tip 52a is forwardly pressed by the user, the clutch mechanism 9 can be switched into the transmission allowed state.

As shown in FIG. 4, the clutch operating member 5 further includes a base plate 53. The clutch-off operating part 51 is attached to the base plate 53. The base plate 53 extends between the first reel body 21 and the second reel body 22. The base plate 53 is supported by and slidable in and along a first guide groove 211 and a second guide groove 221. It should be noted that the first guide groove 211 is formed in the first side plate 21a of the first reel body 21, and extends in the circumferential direction. Additionally, the second guide groove 221 is formed in the second side plate 22a of the second reel body 22, and extends in the circumferential direction.

The base plate 53 includes a mount part 53a. The mount part 53a is a part to be mounted to the reel unit 2. The mount part 53a is rotatably mounted to the reel unit 2. When described in detail, the mount part 53a is mounted to an attachment plate 21c. The attachment plate 21c is fixed to the first side plate 21a. The attachment plate 21c includes a boss 21d. The boss 21d has a cylindrical shape and protrudes axially outward. The mount part 53a includes an opening in the center thereof. The boss 21d is inserted into the opening of the mount part 53a, and thereby, the mount part 53a is rotatably mounted to the boss 21d.

The clutch operating member 5 operates the clutch mechanism 9 through a link mechanism 8. When described in detail, the pinion gear 7 is axially moved in conjunction with an operation of the clutch operating member 5 by a user, and accordingly, the clutch mechanism 9 is switched into either the transmission allowed state or the transmission blocked state. The link mechanism 8 includes a clutch cam 81, a presser plate 82 and a clutch yoke 83.

The clutch cam 81 is configured to be rotated in conjunction with the base plate 53. The clutch cam 81 is disposed rotatably about a rotational axis O. The clutch cam 81 is rotatably attached to the attachment plate 21c. When described in detail, the clutch cam 81 includes an opening in the center thereof. The boss 21d of the attachment plate 21c is inserted into the opening, and thereby, the clutch cam 81 is rotatably mounted to the boss 21d.

The clutch cam 81 includes cam surfaces 81a and a protruding part 81b. The cam surfaces 81a are configured to press the clutch yoke 83 axially outward. Specifically, when the clutch cam 81 is rotated in the counterclockwise direction in a view seen from the outside in the axial direction, the cam surfaces 81a are configured to press the clutch yoke 83 axially outward, and accordingly, the clutch yoke 83 is moved axially outward. The clutch cam 81 is made of, for instance, a synthetic resin.

The protruding part 81b is a part protruding radially outward, and a return member 84 to be described is mounted thereto. The clutch cam 81 further includes an engaging convex part 81c. The engaging convex part 81c protrudes axially inward. The engaging convex part 81c is engaged with an engaging hole 53b of the base plate 53. With the engagement, the base plate 53 and the clutch cam 81 are unitarily rotated about the rotational axis O.

The clutch yoke 83 includes engaging parts 83a. The cam surfaces 81a are engaged with the engaging parts 83a of the clutch yoke 83, and accordingly, the clutch yoke 83 is pressed axially outward. The clutch yoke 83 is supported by the presser plate 82, and is axially movable. It should be noted that the presser plate 82 is disposed in the opening of the base plate 53 and that of the clutch cam 81. Additionally, the presser plate 82 is fixed to the attachment plate 21c.

The presser plate 82 includes a plurality of pins 82a axially extending. The pins 82a respectively extend axially outward. The clutch yoke 83 includes through holes 83b in corresponding positions to the pins 82a. The pins 82a are respectively inserted into the through holes 83b. Thus, the clutch yoke 83 is supported by the pins 82a, and is axially movable.

The clutch yoke 83 is constructed to be engaged with a narrowed part 73 of the pinion gear 7. With the construction, the pinion gear 7 is configured to be axially moved in conjunction with the clutch yoke 83. It should be noted that even when the pinion gear 7 is rotated, the clutch yoke 83 is configured not to be rotated. The clutch yoke 83 is urged axially inward by urging members. When described in detail, the clutch yoke 83 is urged axially inward by a plurality of coil springs 82b respectively supported by the pins 82a of the presser plate 82.

In a normal condition, the clutch yoke 83 is urged axially inward by the respective coil springs 82b. Therefore, the engaging recess 71 of the pinion gear 7 is engaged with the engaging pin 37 of the spool shaft 36. In other words, the clutch mechanism 9 couples the handle 6 and the spool 3. By contrast, when the clutch yoke 83 is moved axially outward by operating the clutch operating member 5, the engaging recess 71 of the pinion gear 7 and the engaging pin 37 are disengaged from each other. As a result, the clutch mechanism 9 decouples the handle 6 and the spool 3 from each other.

The return member 84 is pivotably mounted to the protruding part 81b of the clutch cam 81. The return member 84 includes a pawl part 84b. The pawl part 84b is contacted to the outer peripheral part of a ratchet wheel 101c configured to be unitarily rotated with the drive shaft 101a. The return member 84 is urged to either of two pivot directions by a toggle spring 84a. When the pawl part 84b of the return member 84 is pressed by rotation of the ratchet wheel 101c, the clutch cam 81 is moved axially inward. In other words, the clutch cam 81 is returned from a clutch-off position to a clutch-on position.

As described above, in the dual-bearing reel 100 according to the present preferred embodiment, the second annular wall 41 is formed not on the reel unit 2 but on the intervening member 4, which is a member provided separately from the reel unit 2. With this construction, the second annular wall 41 can be easily formed, and furthermore, it is possible to enhance accuracy in disposing the second annular wall 41 and the second through hole 42 concentrically to each other. In other words, it is possible to enhance accuracy in disposing the second annular wall 41 and the first bearing member 11 concentrically to each other. Therefore, it is possible to enhance accuracy in disposing the second annular wall 41 concentrically to the spool shaft 36.

Modifications

One preferred embodiment of the present invention has been explained above. However, the present invention is not limited to the above, and a variety of changes can be made without departing from the scope of the present invention. For example, the dual-bearing reel 100 according to the aforementioned preferred embodiment has been explained as an electric reel, but may not be the electric reel.

What is claimed is:

1. A dual-bearing reel, comprising:
   a reel unit including a first reel body and a second reel body, the first reel body including a first through hole extending in a rotational axis direction;
   a spool rotatably disposed between the first reel body and the second reel body, the spool including a bobbin trunk and a flange, the flange formed on a first reel body-side end of the bobbin trunk;
   an intervening member disposed between the first reel body and the spool, the intervening member attached to the first reel body, the intervening member including an annular wall and a second through hole, the annular wall including an inner peripheral surface opposed to an outer peripheral surface of the flange, the second through hole extending in the rotational axis direction, the second through hole including a first inner diameter part having a smaller inner diameter than the first through hole;
   a pinion gear disposed within the first reel body, the pinion gear extending in the rotational axis direction; and
   a second bearing member disposed within the first through hole, the second bearing member supporting the pinion gear such that the pinion gear is rotatable, the second bearing member opposed at a first end surface thereof to the intervening member.

2. The dual-bearing reel according to claim 1, further comprising:
   a first bearing member disposed within the second through hole, the first bearing member supporting the spool such that the spool is rotatable.

3. The dual-bearing reel according to claim 2, wherein the second through hole includes a second inner diameter part having a larger inner diameter than the first inner diameter part, and
   the first bearing member is disposed in the second inner diameter part.

4. The dual-bearing reel according to claim 2, further comprising:
   a spool shaft configured to be unitarily rotated with the spool, wherein
   the pinion gear is configured to be moved in one axial direction approaching the second reel body so as to be engaged with the spool shaft, the pinion gear configured to be moved in the other axial direction separating from the second reel body so as to be disengaged from the spool shaft.

5. The dual-bearing reel according to claim 4, wherein the spool shaft includes an engaging pin protruding in a radial direction, and
   the pinion gear includes an engaging recess configured to be engageable with the engaging pin.

6. The dual-bearing reel according to claim 1, wherein the intervening member is made of a synthetic resin.

7. The dual-bearing reel according to claim 1, further comprising:
   a handle for rotating the spool, the handle rotatably mounted to the reel unit;
   a clutch mechanism configured to be switched between a transmission allowed state and a transmission blocked state, the transmission allowed state allowing a transmission of a rotation between the handle and the spool, the transmission blocked state blocking the transmission of the rotation; and
   a clutch operating member configured to switch the clutch mechanism from the transmission allowed state to the transmission blocked state, wherein
   the clutch operating member extends along an outer peripheral surface of the annular wall of the intervening member.

8. A dual-bearing reel, comprising:
   a reel unit including a first reel body and a second reel body, the first reel body including a first through hole extending in a rotational axis direction, a second bearing member disposed within the first through hole;
   a spool rotatably disposed between the first reel body and the second reel body, the spool including a bobbin trunk and a flange, the flange formed on a first reel body-side end of the bobbin trunk;
   first restriction means for restricting a movement of the second bearing member, the first restriction means disposed between the first reel body and the spool, the first restriction means attached to the first reel body, the first restriction means including a second restriction means for restricting an axial movement of the second bearing member; and
   a pinion sear disposed within the first reel body, the pinion gear extending in the rotational axis direction, the second bearing member supporting the pinion gear such that the pinion gear is rotatable, the second bearing member opposed at a first end surface thereof to the first restriction means.

9. The dual-bearing reel according to claim 8, further comprising:
   a first bearing member disposed within the first restriction means, the first bearing member supporting the spool such that the spool is rotatable.

10. The dual-bearing reel according to claim 9, wherein the first restriction means includes a third restriction means for restricting an axial movement of the first bearing member, and
    the first bearing member is disposed in the third restriction means.

11. The dual-bearing reel according to claim 8, wherein the first restriction means includes an annular wall and a second through hole, the annular wall including an inner peripheral surface opposed to an outer peripheral surface of the flange, the second through hole extending in the rotational axis direction.

* * * * *